United States Patent Office 3,349,318
Patented Oct. 24, 1967

3,349,318
SYSTEM FOR CONTROLLING THYRISTORS BY PERIODICALLY RECURRING FIRING PULSES
Herbert Poppinger, Munich, Germany, assignor to Siemens - Schuckertwerke Aktiengesellschaft, Berlin - Siemensstadt, Germany, a corporation of Germany
Filed Sept. 16, 1964, Ser. No. 396,950
11 Claims. (Cl. 322—28)

My invention relates to a system for controlling thyristors. More particularly, my invention relates to a system for controlling thyristors by periodically recurring firing pulses.

The performance of thyristors, such as silicon controlled rectifiers and other semiconductor devices operating as latching switches, is comparable with that of controllable gas discharge tubes or thyratrons. Thyristors thus are applicable in a similar manner for control of direct and alternating currents on the principle of delayed commutation or phase control. Accordingly, thyristors, like thyratrons, can be triggered into conductance by the application of a firing pulse, and then remain latched in conductive condition until the flow of current, depending upon feeder voltage and load, has reached a minimum value close to zero. A substantially continuous variation of the load current or load voltage, therefore, is possible only by varying the phase position of the firing pulses within the positive half-wave of the periodic feeder voltage.

Numerous methods and circuits are known for producing the periodically recurring firing pulses required for such phase control systems. These circuits, in most cases, have a trigger stage which provides a firing pulse whenever a controlling input voltage reaches a given limit value. The input voltage for the trigger stage may be supplied, for example, as a sawtooth voltage upon which a variable direct voltage is superimposed in order to effect the desired control; the cycle period of the sawtooth voltage corresponding to that of the feeder voltage.

Another, rather simple, method is to tap the input voltage for the trigger stage from a capacitor charged through a load resistor from a constant voltage and connected in parallel to a transistor which assists in continuously varying the steepness of the increasing capacitor voltage under the control of a direct voltage. The charging of the capacitor commences always at the beginning of each half wave during which the firing is to occur. The capacitor is therefore discharged shortly prior to the desired instant of firing and the discharge is supposed to occur within the shortest possible time.

The aforementioned method of varying the time position of the firing pulses is readily applicable in cases where the cycle period of the feeder voltage is constant. Under such conditions there is a definite correlation between the feeder voltage applied to the transistor and the phase angle of the firing pulse. Such correlation, however, is no longer existent if the cycle period of the feeder voltage can change. This is the case, for example, when the feeder voltage is derived from an alternating voltage generator driven at a greatly varying speed of rotation. Under such conditions, the relative angle of the firing pulse at a constant controlling direct voltage, varies with the cycle period of the feeder voltage because the phase delay of the instant of firing always remains the same with a constant control voltage. If, for example, at a given cycle period of the feeder voltage, the angle of the firing pulse is 90°, a prolongation of the cycle period to twice the amount results in an angle of the firing pulse of only 45°, assuming that there is a constant control voltage.

It is further necessary that the performance of the control system be unaffected by a reversal in the phase sequence. A reversal in the phase sequence occurs in the regulation of a three-phase generator which is mounted on a vehicle and which has a drive coupled to a wheel shaft of the vehicle. The vehicle may comprise, for example, a railroad car.

For these reasons, the known control systems for producing firing pulses are not applicable for uses in which the cycle period of the feeder voltage may vary within wide limits. It is necessary to employ a control system capable of providing a firing pulse which has a relative angle that remains substantially constant for a given control voltage independently of changes in cycle period of the feeder voltage.

It is an object of my invention to provide a thyristor control system capable of solving the aforementioned problem and eliminating all of the aforementioned deficiencies of the known systems occurring when the feeder voltage of the thyristor is subjected to changes in the length of its cycle period.

The invention is predicated upon a system of controlling thyristors by periodically recurring firing pulses which are issued within a firing range when the voltage at a capacitor has reached a given limit value. The capacitor is charged from the beginning of the cycle of a periodic voltage and the charging condition of the capacitor is dependent upon a control voltage supplied to a transistor connected parallel to the capacitor so that the phase position of the pulses relative to the zero passages of the periodic voltage can be varied within the aforementioned firing range.

In accordance with a feature of the invention, the discharge of the capacitor, occurring within a measuring interval subsequent to each firing range, is made dependent upon the control voltage supplied to the base circuit of the transistor, thus also varying the value of potential which is retained in the capacitor and from which the capacitor commences to be charged at the beginning of each cycle period.

The discharge of the capacitor may commence at the instant that the voltage at the capacitor reaches the limit value required for providing a pulse from the capacitor. If, however, the periodic voltage possesses zero voltage intervals, it is preferable that the capacitor discharge, dependent upon the control voltage, commence with the beginning of such a zero voltage interval. This results in particularly stable control conditions, especially if the invention is utilized as a component of a regulating system.

The charging of the capacitor up to the limit value required for producing a firing pulse proceeds independently of the control voltage at a constant rate. The discharging of the capacitor through the parallel connected transistor may also be blocked at the instant at which the charging of the capacitor commences.

In accordance with the present invention, the voltage produced by a generator operating at varying speed can be regulated in a particularly simple manner. For this purpose, the regulating circuit is energized through a thyristor by a periodically pulsating direct voltage derived by means of rectifiers from the terminal voltage of the generator. The firing pulses for the thyristor are produced by the aforedescribed control systems. In order to obtain a closed feedback regulating circuit, the base of the transistor connected in parallel with the capacitor is connected through a Zener diode to the tap of a voltage divider across the direct current terminals of a rectifier energized by the generator output voltage.

In order that the present invention may be readily carried into effect, it will now be described with reference to the accompanying drawing, wherein.

Figure 1:
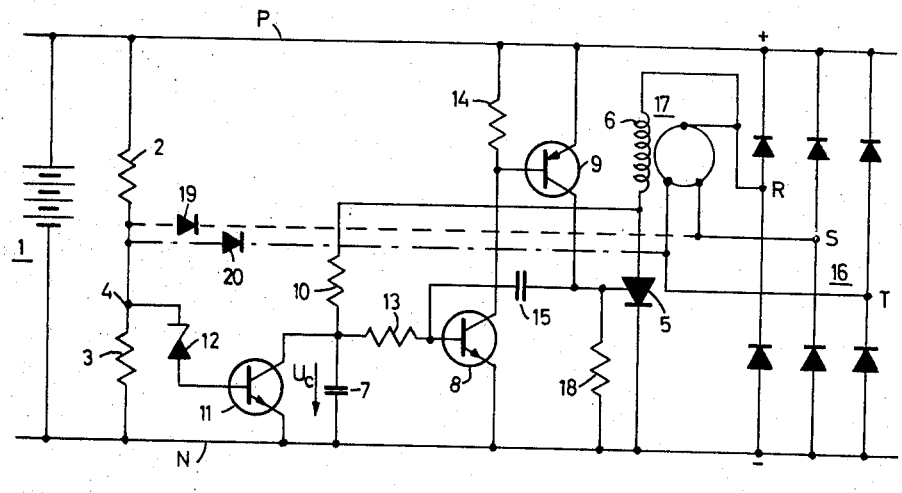
FIG. 1 is a circuit diagram of an embodiment of the control system of the present invention.

In FIG. 1, a generator 17 is a three phase synchronous machine operating at greatly variable speeds and in different directions of rotation. The generator 17 may comprise, for example, the generator of a railroad car utilized to energize the lighting circuits. In this case, the generator 17 is required to operate together with a storage battery in order to supply the lighting installation of a railroad car with voltage exhibiting smallest feasible voltage fluctuations despite the changes in generator operating conditions.

A battery 1 is connected to buses P and N which are energized by the generator 17 through a full-wave rectifier 16. A voltage divider formed by two resistors 2 and 3 is connected between the buses P and N. The voltage divider 2, 3 has a tap 4 to provide a voltage.

A thyristor 5, such as a silicon controlled rectifier, controls the excitation current for a field winding 6 of the generator 17. The field winding 6 in the embodiment of FIG. 1 constitutes the load to be controlled by the thyristor 5. The gate circuit of the thyristor 5 includes a capacitor 7 whose voltage $U_c$, acting through a transistor 8 and an auxiliary transistor 9, determines the firing time point of said thyristor.

The capacitor 7 is connected in series with a resistor 10 across the main path of the thyristor 5, so that the charging of said capacitor is determined by the blocking voltage of the thyristor. The emitter-collector path of a control transistor 11 is connected in parallel with the capacitor 7. The base of the transistor 11 is connected through a Zener diode 12 to the tap 4 of the voltage divider 2, 3 so that the transistor 11 is controlled by the voltage output of said voltage divider.

The base of the transistor 8 is connected through a resistor 13 to the capacitor 7. The ohmic resistor 13 may also be replaced to advantage by a Zener diode. When the transistor 8 is in its conductive condition, a voltage drop occurs across a resistor 14 connected in the collector circuit of said transistor. The voltage drop across the resistor 14 displaces the voltage at the base of the auxiliary transistor 9 to such an extent that the transistor 9 is switched to its conductive condition and supplies a control current to the gate of the thyristor 5. The thyristor 5 is fired to its conductive condition by the control current from the transistor 9 and conducts excitation current passing through the field winding 6 of the generator 17.

The collector electrode of the transistor 9 is connected through a capacitor 15 to the base electrode of transistor 8. This feedback connection permits rapid switching of the transistors 8 and 9.

Figure 3:
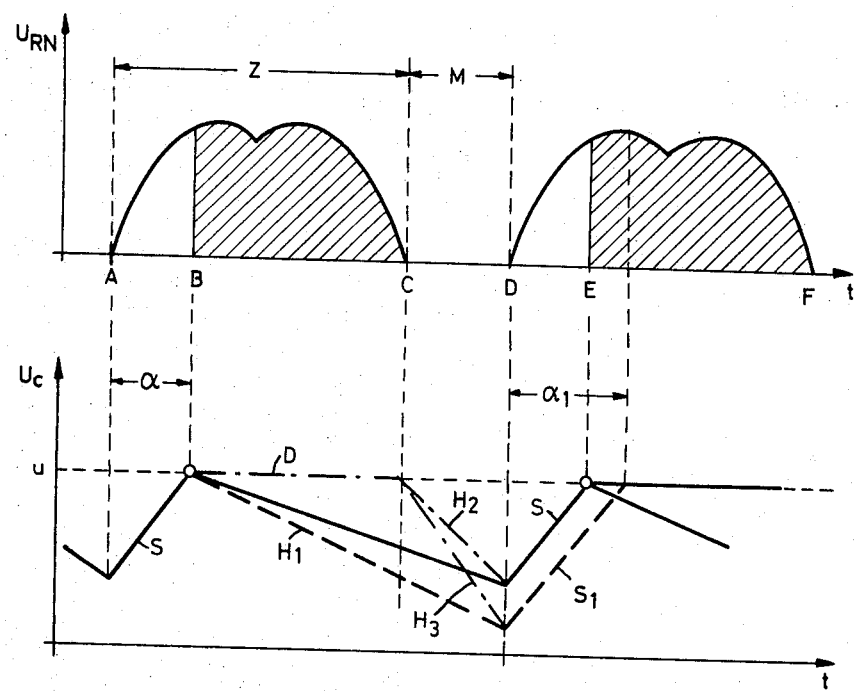
FIG. 3 is a graphical illustration of the operation of the system of FIG. 1.

In order to explain the operation of the control system of FIG. 1, reference is now made to the voltage-time curves of FIG. 3 in which the abscissa denotes time $t$ and the ordinates denote voltage amplitudes.

The upper graph in FIG. 3 shows the time curve of the feeder voltage $U_{RN}$ applied to the generator field winding 6. The voltage $U_{RN}$ is an intermittent direct voltage. The illustrated voltage curve occurs in a load, such as the winding 6, if the load has one end connected through parallel diodes or half-wave rectifiers to two phases S and T of a three phase feeder line and has the other end directly connected to the third phase R of the three phase feeder line, as shown in FIG. 1. This particular connection is in accordance with the energizing circuit disclosed in the copending application of Werner Volkmann, Ser. No. 396,949, filed concurrently with the present application and assigned to the assignee of the present invention.

It will be readily recognized that the intermittent direct voltage is periodical and that each cycle period comprises two successive intervals Z and M. The voltage has finite values only during the interval Z, so that energizing current can flow and firing of the thyristor may occur only during said interval. For this reason, the active voltage interval Z is herein called the "active interval" or the "firing interval." In the next succeeding interval M, which occurs between successive voltage intervals Z, the voltage is zero. The interval M is called the "zero interval" or the "measuring interval." Due to the fact that the intermittent voltage is zero, it is possible to control the median value of the direct current by means of a single thyristor 5 without requiring special means for periodically extinguishing the thyristor.

It is sufficient to periodically supply to the thyristor a firing pulse having a phase position within the firing interval which may be varied in dependence upon a control voltage, during the firing intervals Z. At the end of each firing interval Z, the thyristor 5 is automatically extinguished and becomes non-conductive because the driving feeder voltage in the next successive intermediate or measuring interval M is zero. This is predicated upon the requirement that the measuring interval M have a duration at least equal to the recovery time of the thyristor utilized.

Figure 2:
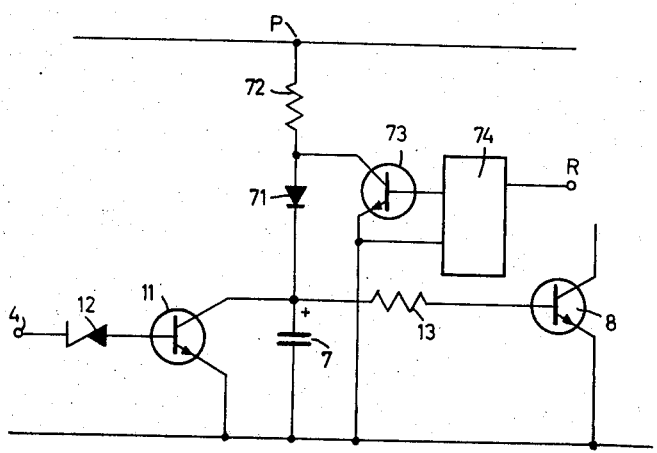
FIG. 2 is a circuit diagram of a modification of the embodiment of FIG. 1.

The gate circuit of the thyristor 5 in FIG. 1 always receives a firing current when the capacitor voltage $U_c$ of the capacitor 7 attains a given critical limit value $u$. The course of the voltage of the capacitor 7 in dependence upon time is illustrated in FIG. 2 in the lower curves in the same time relation as the curve of the feeder voltage. The limit value $u$ is shown.

It is first assumed that the operation is such that the capacitor voltage $U_c$ corresponds to the solid line time curve S, H of FIG. 2. It is also assumed that the thyristor 5 is blocked and that at that time instant A the feeder voltage at said thyristor commences to increase from zero. Consequently, commencing at the instant A, the capacitor 7 is charged continuously. The increasing capacitor voltage is represented by the solid line S.

When the capacitor voltage $U_c$ reaches the limit value $u$ at the time instant B, the trigger stage formed by the transistors 8 and 9 of FIG. 1 is triggered and a pulse is supplied to the thyristor 5. Consequently, the thyristor 5 fires to its conductive condition and remains conductive until the end of the firing interval Z, which terminates at the time instant C.

The voltage of the capacitor 7 cannot increase after the time instant B. The voltage of the capacitor 7 decreases continuously after the instant B. The decrease of the voltage of the capacitor 7 may follow the solid line H of FIG. 2, in dependence upon the control condition of the transistor 11. The emitter-base path of the transistor 11 receives a voltage which is proportional to the amount by which the direct voltage across the buses P and N departs from a reference value determined by the Zener diode 12.

The feeder voltage impressed upon the thyristor 5 becomes zero at the time instant C and the thyristor extinguishes and becomes non-conductive shortly thereafter, so that the capacitor 7 again receives charging current and is charged beginning with the time instant D. The capacitor voltage again reaches the limit value $u$ at the time instant E and the thyristor 5 is again fired and becomes conductive.

As long as the voltage between buses P and N does not change, the control condition and hence the conduction condition of the transistor 11 remains the same. Consequently, at the end of each measuring interval M, the capacitor 7 is always at the same potential level from which it is recharged at the commencement of each new firing interval Z. The relative phase angle $\alpha$ is thus constant, independently of the feeder voltage frequency, as long as the magnitude of the control current through the base of the transistor 11 does not change.

If the voltage between the buses P and N increases, however, so that the emitter-base voltage of the transistor 11 also increases, the capacitor 7 has a lower voltage at the end of the measuring interval M. In such a case, the capacitor voltage is represented in FIG. 2 by broken lines $H_1$, $S_1$. Since the charging of the capacitor 7, proceeding in accordance with the line $S_1$ and commencing at the beginning of the firing interval, is constant and virtually independent of the control voltage applied to the transistor 11, the phase delay angle $\alpha_1$ is greater than the delay angle $\alpha$. This causes a reduction in the magnitude of the voltage between the buses P and N.

As hereinbefore mentioned, the results obtainable with the system of the present invention, especially the stability of the regulating operation, may be considerably increased if the discharge of the capacitor 7 is blocked during the firing interval Z and is shifted into the measuring interval M. A corresponding blocking or making non-conductive of the transistor 11 during the firing interval is obtainable, as shown in FIG. 1, by the utilization of two diodes 19 and 20 connected between the tap 4 of the voltage divider 2, 3 and the respective terminals S and T of the generator 17. This causes the tap point 4 to be virtually connected to the bus N during the firing interval, so that no current can flow through the base circuit of the transistor 11. The diodes 19 and 20 conduct only during the measuring interval M, so that the transistor 11 is conductive during this interval to an extent depending upon the amount by which the voltage between the buses P and N differs from the reference value determined by the Zener diode 12.

The time curve of the capacitor voltage $U_c$ in such a case is simplified and indicated in FIG. 2 by the broken lines $D_2$ and $H_2$ for a relatively slight regulating departure and by the lines $D_2$ and $H_3$ or a greater departure. The charging of the capacitor 7 occurs in substantially the same manner hereinbefore described. The charging of the capacitor 7, however, is not affected by the amount of the regulating departure or regulating error because the transistor 11 is completely blocked or non-conductive during the firing interval Z. The voltage of capacitor 7 again reaches the limit value $u$ at the instant B. Since the thyristor 5 fires and becomes conductive at this moment, the capacitor 7 cannot be charged further.

Since the transistor 11 is non-conductive the capacitor 7 can discharge only through the resistor 18 and the load path of the thyristor 5, as well as through the resistor 14 and the base circuit of the transistor 8. This discharge can be virtually entirely prevented by connecting a decoupling diode in series with the resistor 10 and replacing the resistor 13 with a Zener diode. In the latter case, the capacitor voltage $U_c$ remains approximately constant until the end of the firing interval Z, as ideally shown by the broken line $D_2$ in FIG. 2. The capacitor 7 is discharged through the emitter-collector path of the transistor 11 only when the measuring interval M begins. The value of the voltage at the end of the measuring interval M, that is, at the instant D, is dependent upon the magnitude of the direct voltage between the buses P and N.

In the embodiment of FIG. 1, the extinguishing voltage across the thyristor 5 is used for charging the capacitor 7. Sometimes, however, it is desirable to utilize the approximately constant voltage between the buses P and N to charge the capacitor 7. This is shown in the modification of FIG. 2. For this purpose, the electrode of the capacitor 7 connected to the collector of the transistor 11 may be connected through a diode 71 and a resistor 72 to the bus P; the diode being connected with such a polarity that it can carry a load current. An additional device can then be utilized to shunt the load current past the capacitor 7 during the measuring interval. For this purpose, the diode in the capacitor circuit may be bridged, for example, by means of an electronic switch such as a transistor 73 which is non-conductive during each firing interval. Such transistor 73 may be controlled, for example, by a conventional trigger stage 74 which receives the voltage $U_{RN}$ as a triggering control voltage. Such a regulation exhibits an integrating character because the control signal always depends upon the integral of the regulating error formed at the capacitor 7.

The described control system is also applicable for controlling rectifiers and inverters of conventional type in single phase or multiphase connection. At least two control circuits are needed if the entire range of 360° is to be phase-controlled. When two such control systems are utilized, they can be adapted to each other so that one of the two control systems provides firing pulses during a first period of time corresponding to the firing interval and the second system provides firing pulses which, relative to the first system, would be located in the measuring interval. In this manner, the two systems cover the entire voltage cycle period.

A single control system of the type described suffices, for example, to vary the median value of the direct voltage furnished by a single phase rectifier by controlling the phase angle of the firing pulse, provided a one-way rectification is involved. The control system then operates with firing and measuring intervals of equal duration; the firing interval being coordinated to those voltage half-waves in which a firing of the rectifier branch circuit is possible.

To those skilled in the art, it will be obvious upon a study of this disclosure that thyristor control systems according to my invention are amenable to a variety of modifications and hence can be given embodiments other than those particularly illustrated and described herein, without departing from the essential features of my invention and within the scope of the claims annexed hereto.

I claim:

1. A system for controlling thyristors by periodically recurring firing pulses, comprising
   a load circuit including a thyristor to be controlled thereby, said thyristor having a gate control circuit;
   voltage supply means providing a periodically intermittent output voltage whose cycle comprises an active interval during which a voltage is produced and a zero interval during which no voltage is produced;
   a capacitor connected to said voltage supply means to be charged therefrom each time one of the active intervals of the output voltage of said voltage supply means commences;
   trigger means having a critical trigger voltage and connecting said capacitor to the gate control circuit of said thyristor for supplying thereto a firing pulse during each of the active intervals of the output voltage of said voltage supply means in dependence upon the charge voltage of said capacitor reaching a limit corresponding to the critical trigger voltage of said trigger means; and
   charge control means for controlling the charging and discharging of said capacitor, said charge control means comprising a source of variable control voltage, a resistive semiconductor member having a variable resistance path connected parallel with said capacitor, and a resistance control circuit connected between said source of variable control voltage and said semiconductor member for controlling the charging and discharging of said capacitor to phase-shift the instant of firing relative to the instant of starting of the active interval of the output voltage of said voltage supply means and terminating the subsequent discharging of said capacitor at the instant of starting of the next succeeding active interval, said capacitor having at said instant of starting a residual charge potential depending upon variations of the control voltage from said source of variable control voltage.

2. A control system as claimed in claim 1, further comprising means connecting said capacitor to said voltage supply means and connected with said load circuit for controlling the charging of said capacitor to terminate when said capacitor voltage reaches the limit corresponding to said critical trigger voltage.

3. A control system as claimed in claim 1, further comprising means for blocking the discharge of said capacitor during said active intervals so that said capacitor discharges during said zero intervals.

4. A control system as claimed in claim 1, further comprising means for blocking the flow of charging current during discharging of said capacitor.

5. A control system as claimed in claim 1, further comprising a resistor connected to said voltage supply means in series with said capacitor, and an electronic trigger switch shunting said resistor and capacitor during said zero intervals.

6. A system for controlling thyristors by periodically recurring firing pulses, comprising
a load circuit including a thyristor to be controlled thereby, said thyristor having a gate control circuit;
voltage supply means providing a periodically intermittent output voltage whose cycle comprises an active interval during which a voltage is produced and a zero interval during which no voltage is produced;
a capacitor connected to said voltage supply means to be charged therefrom each time one of the active intervals of the output voltage of said voltage supply means commences;
trigger means having a critical trigger voltage and connecting said capacitor to the gate control circuit of said thyristor for supplying thereto a firing pulse during each of the active intervals of the output voltage of said voltage supply means in dependence upon the charge voltage of said capacitor reaching a limit corresponding to the critical trigger voltage of said trigger means; and
charge control means for controlling the charging and discharging of said capacitor, said charge control means comprising a source of variable control voltage and a transistor having a main path connected in parallel with said capacitor and having a base connected to said source of variable control voltage for controlling the charging and discharging of said capacitor to phase-shift the instant of firing relative to the instant of starting of the active interval of the output voltage of said voltage supply means and terminating the subsequent discharging of said capacitor at the instant of starting of the next succeeding active interval, said capacitor having at said instant of starting a residual charge potential depending upon variations of the control voltage from said source of variable control voltage.

7. A control system as claimed in claim 6, further comprising an alternator of variable speed producing an output voltage which is to be regulated by means of said thyristor, said voltage supply means being connected to said alternator to be energized by the output voltage thereof, and wherein said load circuit includes a voltage controlling field winding of said alternator connected in series with said thyristor.

8. A control system as claimed in claim 7, further comprising a rectifier connected to the output of said alternator and having output buses, a voltage divider connected between said buses and having a tap to constitute said source of variable control voltage, and a Zener diode connected between said tap and said base of said transistor.

9. A control system as claimed in claim 8, wherein said alternator has three-phase output terminals, and further comprising two diodes connecting the tap of said voltage divider to two of said three output terminals respectively of said alternator.

10. A system for controlling thyristors by periodically recurring firing pulses, comprising
a load circuit including a thyristor to be controlled thereby, said thyristor having a gate control circuit;
voltage supply means providing a periodically intermittent output voltage whose cycle comprises an active interval during which a voltage is produced and a zero interval during which no interval is produced;
a capacitor connected to said voltage supply means to be charged therefrom each time one of the active intervals of the output voltage of said voltage supply means commences;
trigger means having a critical trigger voltage and connecting said capacitor to the gate control circuit of said thyristor for supplying thereto a firing pulse during each of the active intervals of the output voltage of said voltage supply means in dependence upon the charge voltage of said capacitor reaching a limit corresponding to the trigger voltage of said trigger means; and
charge control means for controlling the charging and discharging of said capacitor, said charge control means comprising a source of variable control voltage and a transistor having a main path parallel connected in parallel with said capacitor and having a base connected to said source of variable control voltage for controlling the charging and discharging of said capacitor to phase-shift the instant of firing relative to the instant of starting of the active interval of the output voltage of said voltage supply means and terminating the subsequent discharging of said capacitor at the instant of starting of the next succeeding active interval, said transistor being poled in blocking relation to the flow of capacitor charging current from said voltage supply means so that the charging rate during said active interval is independent of said control voltage, and said capacitor having at said instant of starting a residual charge potential depending upon variations of the control voltage from said source of variable control voltage.

11. A control system as claimed in claim 10, wherein said load circuit is connected to said voltage supply means and said capacitor has a charging circuit connected parallel to said thyristor so as to be charged by the voltage at said thyristor up to the instant of firing in each of said active intervals.

References Cited

UNITED STATES PATENTS 3,263,155   7/1966   Dietl _____ 322—28

MILTON O. HIRSHFIELD, *Primary Examiner.*

J. D. TRAMMELL, *Assistant Examiner.*